United States Patent
Griessbaum

(10) Patent No.: US 7,246,184 B2
(45) Date of Patent: Jul. 17, 2007

(54) METHOD FOR CONFIGURING AND/OR OPERATING AN AUTOMATION DEVICE

(75) Inventor: Reiner Griessbaum, Ruelzheim (DE)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 10/961,250

(22) Filed: Oct. 12, 2004

(65) Prior Publication Data

US 2005/0132113 A1   Jun. 16, 2005

Related U.S. Application Data

(63) Continuation of application No. PCT/DE03/01238, filed on Apr. 11, 2003.

(30) Foreign Application Priority Data

Apr. 12, 2002   (DE) ................. 102 16 277

(51) Int. Cl.
G06F 13/00   (2006.01)
(52) U.S. Cl. .............. 710/110; 710/240; 710/107
(58) Field of Classification Search ........ 710/240–244, 710/110, 107
See application file for complete search history.

(56) References Cited

U.S. PATENT DOCUMENTS 6,131,114 A * 10/2000 Guezou et al. ............. 709/216
6,282,572 B1   8/2001 Dahlin et al.
6,490,642 B1 * 12/2002 Thekkath et al. ........... 710/110
6,772,254 B2 * 8/2004 Hofmann et al. ........... 710/110

FOREIGN PATENT DOCUMENTS

| DE | 197 11 958 A1 | 9/1998 |
| EP | 0 778 688 A2 | 6/1997 |
| WO | WO 99/49373 A1 | 9/1999 |
| WO | WO 00/69116 A2 | 11/2000 |

OTHER PUBLICATIONS

Siemens—Katalog St 70, Chapter 6, "Dezentrale Peripherie", 2001, pp. 6/1-6/4.
Siemens—Katalog St Pcs 7, Chapter 1, "Simatic Prozessleitsystem Simatic Pcs 7", 2001, pp. 1-30.

* cited by examiner

Primary Examiner—Khanh Dang
Assistant Examiner—Kim T. Huynh
(74) Attorney, Agent, or Firm—Sughrue Mion, PLLC

(57) ABSTRACT

A method and an engineering system, which reduce the extent of configuration work with regard to a possible expansion of the automation device. A configured automation device can thus be expanded during the control of the automation device by means of slave modules. During a configuration phase, the number of the slave units (11, 12, 13, 16, 17, 18) and a user data area for each slave unit can be configured. For each slave module of a slave unit, a portion of the user data area can be assigned. The user data area is prepared for a possible expansion of the slave unit by at least one slave module in that, in addition to the configured user data area of a respective slave unit required for the current control, a reserve user data area (11c, 11d, 13b, 13c, 13d, 16d, 18d) is configured for the at least one slave module.

18 Claims, 2 Drawing Sheets

METHOD FOR CONFIGURING AND/OR OPERATING AN AUTOMATION DEVICE

This is a Continuation of International Application PCT/DE03/01238, with an international filing date of Apr. 11, 2003, which was published under PCT Article 21(2) in German, and the disclosure of which is incorporated into this application by reference.

FIELD AND BACKGROUND OF THE INVENTION

1. Field of the Invention

The present invention relates to a method and engineering system for configuring and/or operating an automation device and to an automation device. In particular, the present invention relates to a method and an engineering system for configuring and/or operating an automation device with a master unit and at least one slave unit that is connected to the master unit via a bus.

2. Description of Related Art

An automation device with so-called "decentralized peripherals" is known from the Siemens Catalog ST 70, Chapter 6, 2001 Edition, which is incorporated herein by reference. These "decentralized peripherals" are provided for decentralized solutions to automation tasks in production engineering, process engineering and systems control engineering. These decentralized peripherals usually include different peripheral devices with a number of slave modules, which are connected to a master unit via a bus. The master unit is usually a master module, which is a component of a powerful programmable controller having at least one CPU and further functional modules to solve complex automation tasks.

Actuators and/or sensors can be connected to the slave modules of a slave unit. Peripheral process input data transmitted by the sensors can be stored in the slave units. Moreover, the slave units can supply the actuators with peripheral process output data, which the master unit transmits to the slave units. An essential task of the master unit, on the one hand, is to transmit the peripheral process input data as an image to a higher-level processing unit of a programmable controller and, on the other hand, to process the image of the peripheral process output data supplied to the master unit by the higher-level processing unit and then to transmit this processed peripheral process output data to the slave units in the form of peripheral process output data. The higher-level processing unit cyclically processes the image of the peripheral process input data and that of the peripheral process output data during a processing time interval. This processing time interval (processing cycle) is essentially coordinated with a master access interval (master cycle) of the master unit. During this master access interval, the master unit performs read and/or write accesses to all of the slave units that are connected to the bus during an open loop control.

The master unit cyclically transmits to each slave unit the peripheral process output data associated with the corresponding slave units, such that the master access interval is essentially determined by the number of the slave units connected to the bus. In response to the transmission of the peripheral process output data, each slave unit performs a write access to the bus during a slave-specific slave access interval, in order to transmit its peripheral process output data to the master unit.

To enable the master unit to perform read and/or write accesses to the slave modules of the slave units, a user data area is provided for each slave unit. Data are written into this user data area and/or data are read from this user data area. Each slave module is assigned a portion of this user data area.

The size of a user data area for a slave unit can be configured, for example, using an engineering system, which is known from Siemens Catalog ST PCS 7, Chapter 1, 2001 Edition. Siemens Catalog ST PCS 7, Chapter 1, 2001 Edition is incorporated herein by reference. The size of the user data area to be configured is adapted to the number of slave modules in this slave unit in accordance with a control task to be solved.

It may occur, for example, that due to changes with regard to the control task to be solved, a slave unit must be expanded by an additional slave module. This means that the user data area of this slave unit must be newly configured or reconfigured such that the master unit can address the additional slave module during an open loop control or a closed loop control. Reconfiguring the slave unit is time-consuming, particularly because the new configuration must be tested prior to the control, e.g., an open loop control or a closed loop control.

OBJECTS OF THE INVENTION

One object of the present invention is to provide a method for configuring and/or operating an automation device which reduces the configuration time with respect to a possible expansion of an automation device by slave modules. A further object of the invention is to provide an engineering system, which makes it possible to carry out the method for configuring an automation device. Yet another object is to provide an automation device that is expandable by one or more additional slave modules during the control such as an open or closed loop control.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an exemplary, non-limiting formulation of the present invention, a method for at least one of configuring and operating an automation device is provided. In this exemplary method, the automation device comprises a master unit and a plurality of slave units connected to the master unit via a bus. Each of the plurality of slave units is configured to receive at least one slave module. In this method, during a configuration phase, a number of the slave units and a user data area for each of the slave units is configured. The master unit is configured to perform at least one of a read access and a write access to the slave units. In addition, a portion of the user data area is assigned to a slave unit for each slave module of the slave unit. An additional reserve user data area for at least one slave module of a respective slave unit from the plurality of slave units is configured for an expansion of the slave unit by the at least one slave module.

In accordance with another exemplary, non-limiting formulation, an engineering system for configuring an automation device is provided. The automation device comprises a master unit and a plurality of slave units connected to the master unit via a bus. The slave units being configured to receive at least one slave module. In this engineering system, during a configuration phase, a number of slave units and a user data area for each slave unit of the plurality of slave units are configured. The master unit being configured to perform at least one of a read access and a write access to the plurality of slave units. For each slave module of a slave unit, a portion of the user data area is assigned to the slave unit. In addition, in this engineering system, the user data area of the at least one slave unit is prepared for an expansion of the at least one slave unit by at least one slave module by configuring at least one reserve user data area for the at least one slave module.

According to yet another exemplary, non-limiting formulation of the present invention, an automation device is provided. The automation device has a master unit, a bus, and a plurality of slave units connected to the master unit via the bus. The slave units being configured to receive at least one slave module. In this automation device, during a configuration phase, a number of the slave units and a user data area for each of the slave units is configured. The master unit being configured to perform at least one of a read access and a write access to the slave units. In addition, for each slave module of a slave unit, a portion of the user data area is assigned to the slave unit. Finally, for at least one slave unit, the user data area of the at least one slave unit is prepared for an expansion of the at least one slave unit by at least one slave module by configuring at least one reserve user data area for the at least one slave module.

According to exemplary, non-limiting formulations, by configuring at least one "reserve user data area" for a slave unit, this slave unit is prepared for an expansion by at least one additional slave module. If this slave unit is in fact expanded by an additional slave module, there is no repercussion for all the master and slave units connected to the bus, i.e., there is no repercussion with respect to the data exchange between the master unit and the slave units or the slave modules of these slave units. Moreover, a new configuration or reconfiguration with respect to the user data area and testing of the automation device expanded by the additional slave module is not required.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements.

DETAILED DESCRIPTION OF ILLUSTRATIVE, NON-LIMITING EMBODIMENTS

Figure 1:
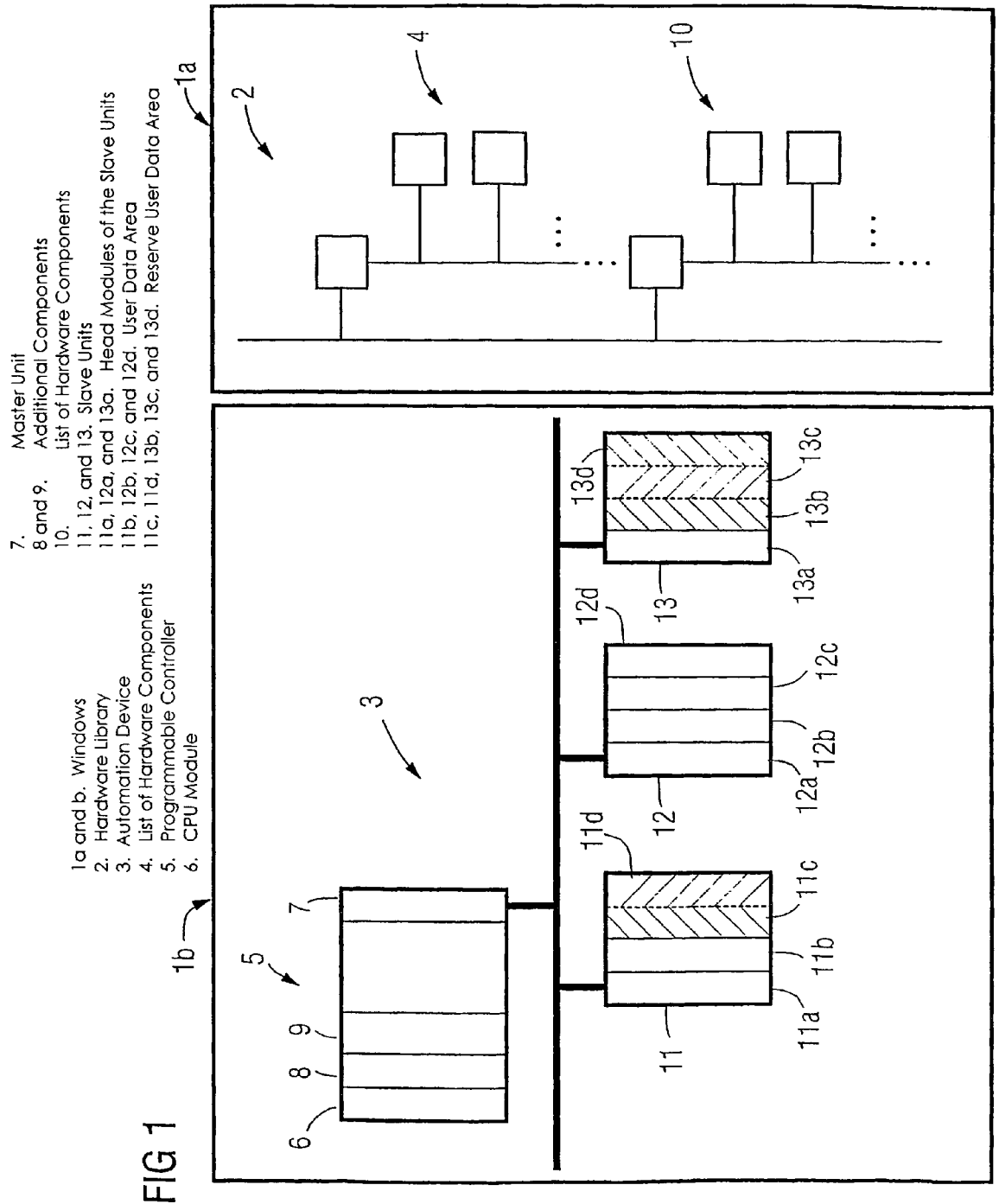
FIG. 1 shows a user interface of an engineering system in accordance with an exemplary, non-limiting embodiment of the present invention.

FIG. 1 shows an engineering system with a display in accordance with an exemplary, non-limiting embodiment of the present invention. This display has two windows of a user interface, designated 1a and 1b, respectively. The window 1a is provided to display a hardware library 2 of an automation device, while the window 1b displays the currently configured hardware of an automation device 3. The hardware library 2 contains configuration data for modules of a programmable controller, e.g., CPU modules, communication modules, digital input and/or output modules, and configuration data for modules of peripheral devices and bus systems with associated bus connections. To configure the automation device, an operator uses his mouse in a drag and drop operation to select a hardware component from the window 1a, to copy the selected hardware component to the window 1b, and to combine the components in the window 1b with the copied component in accordance with a control task to be solved.

In the depicted example, a programmable controller 5 with a CPU module 6, a master unit 7, and two additional components 8 and 9, is selected from a list 4 of the hardware library 2. Of course the master unit does not have to be a part of the programmable controller 5. Instead, the master unit can be selected as a component of a central device that includes a number of modules and that is connected to the programmable controller via a bus.

Moreover, in the depicted example, a first, a second, and a third slave unit 11, 12, and 13, respectively, are selected from a list 10 of the hardware library 2. Each of these slave units 11, 12, and 13, has a respective head module 11a, 12a, and 13a that can be selected from the hardware library 2. The slave units are connected to the master unit 7 via a bus connection. The bus connection is also selected from the hardware library 2. The master unit 7, the slave units 11, 12, 13, and the bus connection for coupling the units, are components of the decentralized peripheral devices. In addition to the slave units 11, 12, and 13, a user data area provided for selectable slave modules, e.g., slave modules in the form of digital and/or analog input/output modules, can be configured for each slave unit 11, 12, and 13. Each selected slave module can be assigned a portion of this user data area.

In the depicted exemplary embodiment, a maximum possible user data area is configured only for the slave unit 12, which can be assigned selectable slave modules of different functionalities, and one user data area 11b is configured for the slave unit 11. A slave module is assigned to the user data area 11b. It is possible, for example, to assign a portion 12b of the user data area to a digital input module, a portion 12c to a digital output module and a portion 12d to a digital input and output module. In addition to a user data area for the configured slave modules of each slave unit 11, 12, 13, the engineering system is configured such that an operator can configure a reserve or additional user data area. No slave modules are configured and assigned yet to this additional or reserve user data area. These reserve user data areas are specially identified in the display window 1b, as illustrated in FIG. 1.

In the depicted example, the slave unit 11 has a reserve user data area 11c and 11d, which is provided for a possible expansion of the slave unit 11 by two slave modules of the same or a different functionality during a control of the automation device. The control of the automation device, for example, may be an open loop control or a closed loop control. The slave unit 13 has a reserve user data area 13b, 13c, and 13d. This reserve user data area 13b, 13c, and 13d is likewise provided for a possible expansion of the slave unit 13. In the depicted example, the maximum possible user data area of the slave unit 13 is identified as a reserve user data area. This means that no slave modules except the head module 13a are configured for the slave unit 13, and the slave unit 13 can be expanded during the control by three slave modules of the same or a different functionality.

Figure 2:
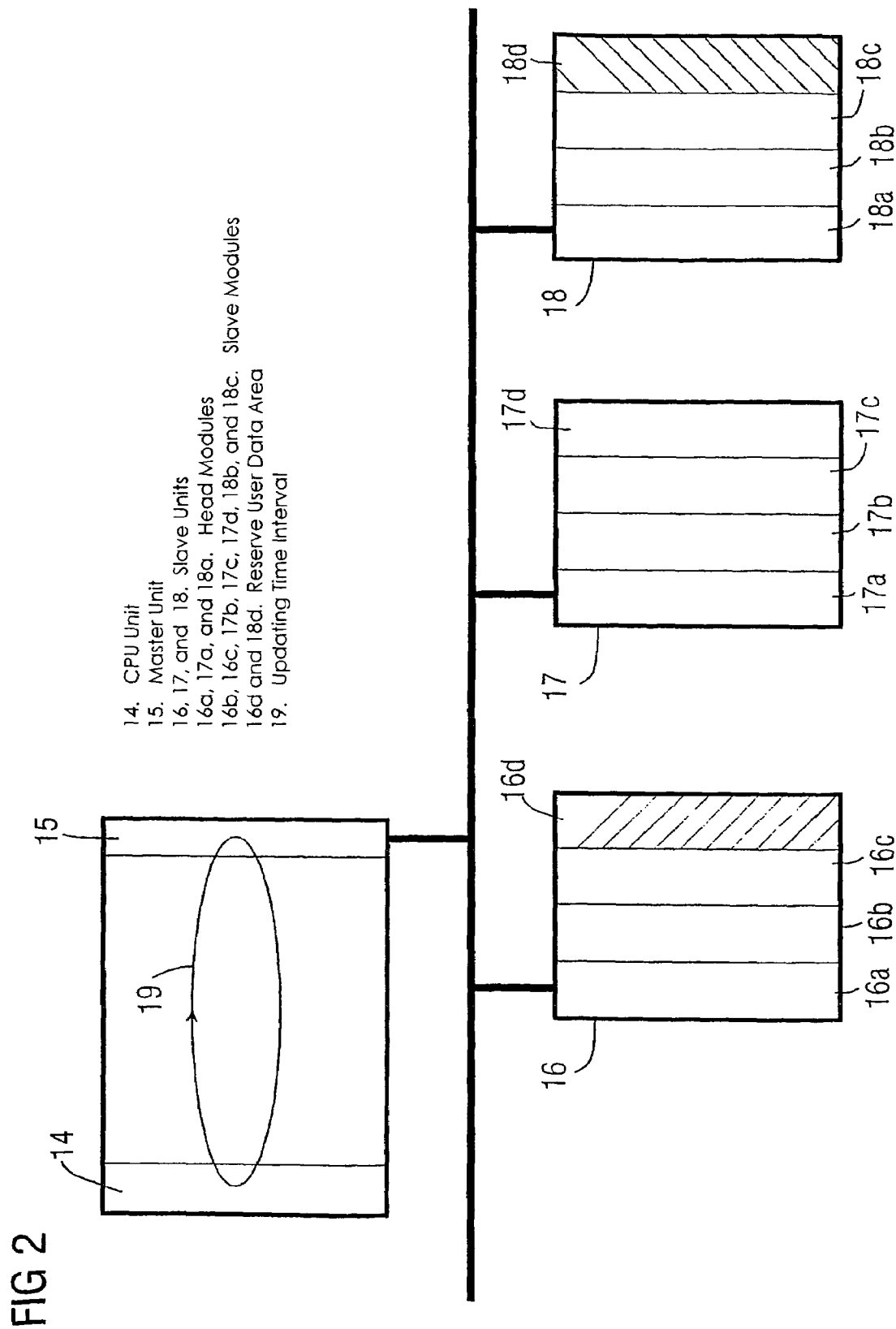
FIG. 2 shows a configured automation device in accordance with an exemplary, non-limiting embodiment of the present invention.

Reference is now made to FIG. 2, which depicts a configured automation device in accordance with an exemplary, non-limiting embodiment of the present invention. The components of this configured automation device for controlling a technical process are a programmable controller with a higher-level CPU unit 14, a master unit 15, and three slave units 16, 17, and 18. The slave units 16, 17, and 18, each have a corresponding head module 16a, 17a, and 18a via which the master unit 15 performs read and/or write accesses to the slave modules of the slave units 16, 17, and 18. The slave unit 17 is equipped with three slave modules 17b, 17c, 17d, while the slave units 16, 18 are each equipped with only two slave modules 16b, 16c, 18b, and 18c. These slave units 16 and 18 equipped with only two slave modules are prepared for an expansion by additional slave modules. An assigned reserve user data area 16d and 18d has been configured for a respective slave module 16 and 18.

As a result of a required change or expansion of the control task, the slave unit 16 must be expanded by an additional slave module, e.g., in the form of an analog input module, while the slave unit 18 must be expanded, e.g., by a slave module in the form of a digital output module. This expansion is possible without new configuration or reconfiguration of the automation device. This expansion occurs during an ongoing open or closed loop control. To expand the automation device, the engineering system is used to assign the new slave modules to the previously configured reserve user data areas. This reconfiguration is carried out during the current open or closed loop control.

In the depicted example, the reserve user data area 16d is assigned to the analog input module and the reserve user data area 18d is assigned to the digital output module. Subsequently, the engineering system essentially transmits the changed configuration data to the higher-level CPU unit 14, e.g., in an online operation, such that the CPU unit 14 supplies these changes to the master unit 15 during an updating time interval 19. The analog input module and the digital output module can be inserted into the respective slave units 16 and 18 during control of the automation device.

The master unit can perform read and/or write accesses to these modules only after the respective head modules 16a and 18a of the slave units 16 and 18 have been signaled or informed that the new slave modules were used in these units 16 and 18. To signal a configuration change to the head modules 16a and 18a, the master unit 15 transmits to the slave units 16 and 18, e.g., during an open loop control of the automation device, a message. This message signals the reconfigured data to the respective head modules 16a and 18a i.e., the master unit 15 signals the assignment of the respective reserved user data area 16d and 18d to the newly added slave modules of the slave units 16 and 18.

In the depicted example, the reserved user data area 16d is assigned to the newly added analog input module. The analog input module is added to the slave unit 16. In addition, the reserved user data area 18d is assigned to the newly added digital output module. The digital output module is added to the slave unit 18. As a result, the master unit 15 can perform read and/or write accesses to the analog input module and the digital output module via this user data area 16d and 18d during the control of the automation device.

Through the configuration of reserve user data areas, the automation device is prepared for a possible expansion by the slave modules. If the automation device is in fact expanded by the slave modules, no repercussions or delays occur, i.e., repercussions on the units connected to the bus with respect to a data exchange between the master and the slave units during the control of the automation device. In other words, delays, because of the configuration change, in data exchange between the master unit 15 and slave units 16, 17, and 18 are prevented. It is of course possible to configure a plurality of different reserve user data areas as "neutral" user data areas for the slave units. This means that the automation device can be expanded for control by slave modules of any functionality (any type), such that an adaptation to a change in the control task to be solved is easily possible.

The above description of illustrative, non-limiting embodiments has been given by way of an example. The above and other features of the invention including various novel method steps and a device of the various novel components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A method for at least one of configuring and operating an automation device, the automation device comprising a master unit and a plurality of slave units connected to the master unit via a bus, each of the plurality of slave units receives at least one slave module, the method comprising:

during a configuration phase:
configuring a number of the slave units and a user data area for each of the slave units, the master unit performs at least one of a read access and a write access to the slave units,
assigning a portion of the user data area to a slave unit for each slave module of the slave unit,
configuring an additional reserve user data area for at least one slave module of a respective slave unit from the plurality of slave units for an expansion of the respective slave unit by the at least one slave module.

2. The method as claimed in claim 1, wherein the user data area and the reserve user data area of the at least one slave unit is configured in a menu-driven manner.

3. The method according to claim 1, wherein the master unit performs at least one of a read access and a write access to the slave units during an open loop control.

4. The method according to claim 1, wherein the master unit performs at least one of a read access and a write access during a closed loop control.

5. An engineering system for configuring an automation device, the automation device comprising a master unit and a plurality of slave units connected to the master unit via a bus, the slave units receive at least one slave module, wherein, during a configuration phase, the engineering system configures a number of slave units and a user data area for each slave unit of the plurality of slave units, the master unit performs at least one of a read access and a write access to the plurality of slave units, for each slave module of a slave unit from the plurality of slave units, a portion of the user data area is assigned to the slave unit, for at least one slave unit from the plurality of slave units, the user data area of the at least one slave unit is prepared for an expansion of the at least one slave unit by at least one slave module by configuring at least one reserve user data area for the at least one slave module of a respective slave unit.

6. The engineering system as claimed in claim 5, wherein the engineering system configures the user data area and the reserve user data area in a menu-driven manner.

7. The engineering system according to claim 5, wherein the master unit performs at least one of a read access and a write access to the slave units during an open loop control.

8. The engineering system according to claim 5, wherein the master unit performs at least one of a read access and a write access during a closed loop control.

9. An automation device comprising:
a master unit;
a bus; and
a plurality of slave units connected to the master unit via the bus, the slave units receive at least one slave module,
wherein during a configuration phase, a number of the slave units and a user data area for each of the slave units is configured, the master unit performs at least one of a read access and a write access to the slave units, and
wherein for each slave module of a slave unit from the plurality of slave units, a portion of the user data area is assigned to the slave unit,
wherein for at least one slave unit, the user data area of the at least one slave unit is prepared for an expansion of the at least one slave unit by at least one slave module by configuring at least one reserve user data area for the at least one slave module of a respective slave unit.

10. The automation device as claimed in claim 9, wherein the master unit signals an expansion of the automation device by the at least one slave module to a head module of the expanded slave unit.

11. The automation device according to claim 9, wherein the master unit performs at least one of a read access and a write access to the slave units during an open loop control.

12. The automation device according to claim 9, wherein the master unit performs at least one of a read access and a write access during a closed loop control.

13. The method according to claim 1, wherein the slave units are decentralized peripheral devices and the master unit is a programmable controller.

14. The method according to claim 13, wherein the decentralized peripheral devices monitor data of devices involved in an automation process.

15. The method according to claim 1, wherein, during operation of the automation device, adding a new slave module to the respective slave unit and assigning at least a portion of the additional reserve user data area for the new slave module, wherein the additional reserve user data area has memory dedicated to the respective slave unit.

16. The method according to claim 1, wherein, during an open loop or a closed loop control, a new slave module is added to the respective slave unit and assigned at least a portion of the additional reserve user data area.

17. The method according to claim 16, wherein in said control, a reconfiguration interval is provided, and wherein, during said reconfiguration interval, the new slave module is added in the assigned portion of the additional reserve user data area.

18. The method according to claim 1, wherein only new slave modules of the respective slave unit are assigned to the additional reserve user data of the respective slave unit and wherein the additional reserve user data is dedicated memory of the respective slave unit.

* * * * *